Sept. 29, 1959   I. C. ROGERS   2,906,353
SPRING SHANK MOUNTING
Filed Feb. 20, 1956                                    2 Sheets-Sheet 1

INVENTOR.
IVOR C. ROGERS
BY
James E. Nilles
ATTORNEY.

Sept. 29, 1959     I. C. ROGERS     2,906,353
SPRING SHANK MOUNTING

Filed Feb. 20, 1956     2 Sheets-Sheet 2

INVENTOR.
IVOR C. ROGERS
BY
James E. Nilles
ATTORNEY.

United States Patent Office 2,906,353
Patented Sept. 29, 1959

2,906,353
SPRING SHANK MOUNTING

Ivor C. Rogers, Toronto, Ontario, Canada, assignor to Massey-Ferguson Inc., a corporation of Maryland Application February 20, 1956, Serial No. 566,706

2 Claims. (Cl. 172—265)

This invention relates to earth working implements, such as cultivators, and is more particularly directed to a quick releasable mounting therefor. The invention finds particular utility when used with spring shanks which have a certain amount of flexibility, particularly when striking an obstruction.

In the co-pending U.S. application, Serial No. 503,564, filed April 25, 1955, now Patent No. 2,850,956, issued Sept. 9, 1958 of which I am a co-inventor, there is disclosed a releasable mounting which performs satisfactorily under a majority of obstacle encountering situations. However, the shank disclosed in that application is of the rigid type which is incapable of flexing to any appreciable extent. Furthermore, the spring pressure is applied to a point on the shank which is located a considerable distance to the rear of the shank's pivot point. In practice, it has been found that when a rigid shank of this type strikes an "overhanging" obstruction in the ground, such as a buried log or rock, and the point of the shank goes underneath such an obstruction, the tool is incapable of flexing in a rearward direction and is thus unable to free itself, notwithstanding the fact that it is resiliently mounted. This resulted in the shank being stressed past its elastic limit and permanent deformation of the shank resulted, as well as damage to the shank mounting. The mounting disclosed in the present application embodies certain of the advantages of the device of the said co-pending application and in addition improves the mounting in certain respects.

It is a general object of this invention to provide an improved automatically resetting, quick release, resilient mounting for earth working tools.

It is another object of the invention to provide a resilient mounting for an earth working tool in which the force required to raise the tool is substantially reduced throughout the tool's upward movement, and in which the major portion of the length of the tool shank is free to flex, thereby minimizing damage to the tool and mounting, particularly when an overhanging obstacle is encountered.

An object of this invention is to provide a quick releasable mounting which resiliently holds a spring shank in the working position in such a manner as to permit the shank itself to flex generally rearwardly upon striking an obstruction as well as permitting the shank to be bodily raised.

It is an object of this invention to provide a quick releasable mounting, of the relatively fixed pre-load type, for a spring shank which permits the working tip of the shank to immediately move rearwardly and upwardly when striking an obstruction.

Other objects and advantages will become more apparent from the following detailed description, taken in conjunction with the attached sheets of drawings in which, by way of preferred example only, is illustrated one embodiment of this invention.

Figure 1:
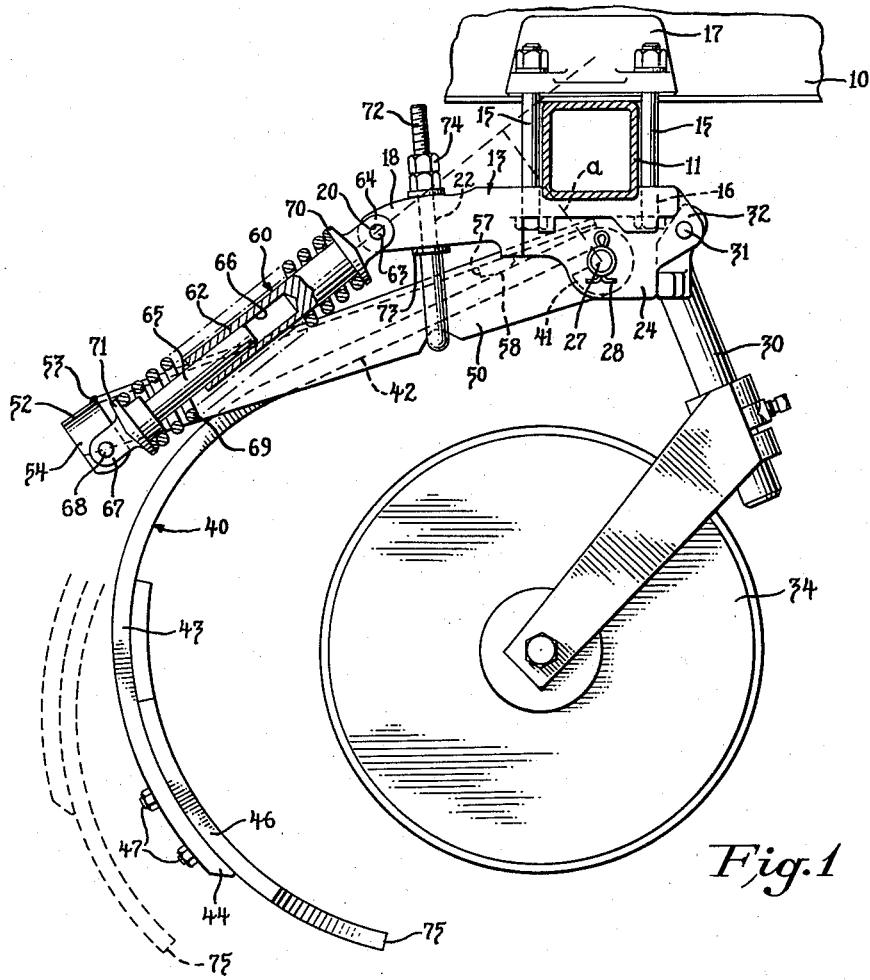
Figure 1 is a side elevational view of the tool mounting made in accordance with the invention, showing the tool in the earth working position, and with certain parts shown in section.
Figure 2:
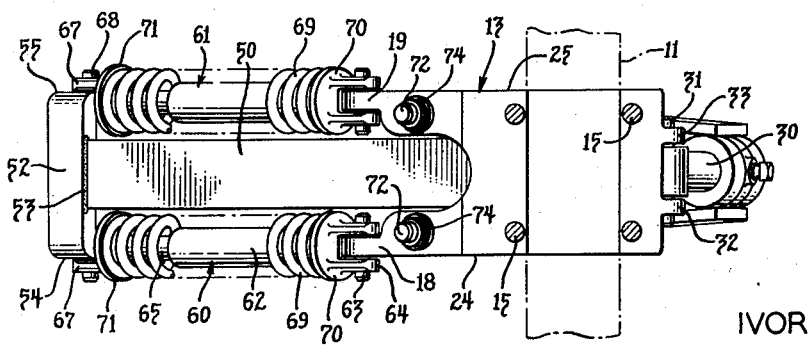
Figure 2 is a plan view of the device shown in Figure 1, with the tool bar shown in broken lines and the attaching bolts in section for the sake of clarity in the drawings.
Figure 3:
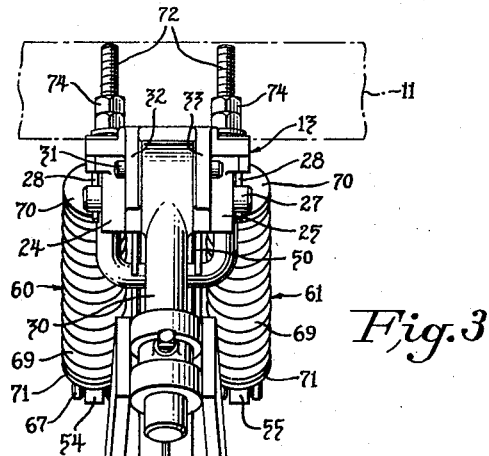
Figure 3 is a front elevational view of the device as shown in Figure 1, but with the supporting tool bar shown only in broken lines.

Implements of this character are generally secured to a supporting frame for movement over the ground at a substantially constant but adjustable height relative thereto. These conventional support frames usually comprise a series of longitudinally and transversely disposed beams rigidly secured together. A plurality of earth working tools are generally adjustably secured to such a support framework. Referring more particularly to the drawings, the support structure shown here comprises an angle iron member 10 which is disposed longitudinally, in the direction of implement travel, and a transverse tool bar 11 is secured thereto. The support structure may also be considered as comprising a mounting bracket 13 which is rigidly secured to the bar 11 by bolt means 15 extending through apertures 16 (Fig. 1) in bracket 13 and also through clamps 17 which abut against the top side of bar 11. The bracket 13 is bifurcated at its rear end and the portions 18, 19 so formed have transversely aligned apertures 20 extending therethrough. Portions 18, 19 also each have a generally vertically disposed aperture 22 extending therethrough. The bracket is also in the form of an inverted channel having downwardly extending side portions 24, 25 through which extends a shank pivot pin 27 held captive therein by cotter keys 28.

A coulter post 30 is pivotally secured by a pin 31 to the forward end of bracket 13 and between the forwardly extending ear portions 32, 33 a rolling coulter 34 is adjustably secured to post 30 in the conventional manner. As the coulter and its mounting form no part of the present invention, further comment relative thereto is deemed unnecessary.

A flat spring shank 40 has a hook portion 41 at its forward end through which passes the pivot pin 27. Thus the shank is capable of rising and falling, relative to bracket 13, about its pivotal connection formed by pin 27. Shank 40 is also comprised of a relatively straight portion 42 which extends rearwardly a distance from the hook portion 41. The rear portion 43 of the shank is curved and terminates in a forwardly extending end portion 44 to which is attached a ground engaging tool 46, shown here as a conventional chisel point, by bolt means 47.

A pressure transmitting member in the form of a channel member 50 is also pivotally secured at its forward end on pin 27 which extends therethrough. Channel member 50 has its open side facing downwardly and the straight portion 42 of shank 40 lies generally within the channel. Channel member 50 extends rearwardly and terminates above the curved shank portion 43. A downwardly facing U shaped bracket 52 is welded as at 53 to the rear end of pressure member 50 and each leg 54, 55 thereof has an aperture therethrough. Within the pressure transmitting channel member 50, and near the forward end thereof, is secured a lug 57 which bears against the upper side of shank 40 and acts as a pressure point through which spring pressure is applied to the shank as follows.

Resilient means are provided for urging the shank downwardly and into engagement with the ground. This resilient means acts between bracket 13 and pressure transmitting member 50 and then through the latter against a forward point 58 on the shank. This resilient means take the form, for purposes of illustration, of two identical telescoping spring-strut units 60, 61 one of which is located on each side of member 50 substantially above the shank 40. As these units are identical, only one will be described. The female portion 62 of these units is pivotally secured at its forward end to bracket 13 on a pin 63 which extends through the bifuracted end 64 of portion 62 and through the registering aperture 20 in bracket 13. The male portion 65 is telescopingly engaged in the bore 66 of portion 62 and is pivotally secured by its rear bifurcated end 67 on the pin 68 extending through leg 54. A compression coil spring 69 surrounds strut portions 62, 65 and urges them apart by bearing against their respective shoulders 70, 71. Thus spring pressure is transmitted from the fixed bracket 13 through channel member 50 and its pressure point or lug 57 to the shank.

A U-bolt 72 extends through apertures 22 in the bracket portions 18, 19 and is rigidly secured thereto by its shoulder portions 73 and nuts 74. U-bolt 72 passes underneath channel member 50 and serves to limit its downward movement, when the entire support structure is raised, thus holding the tool and mounting in assembled relationship.

Figure 4:
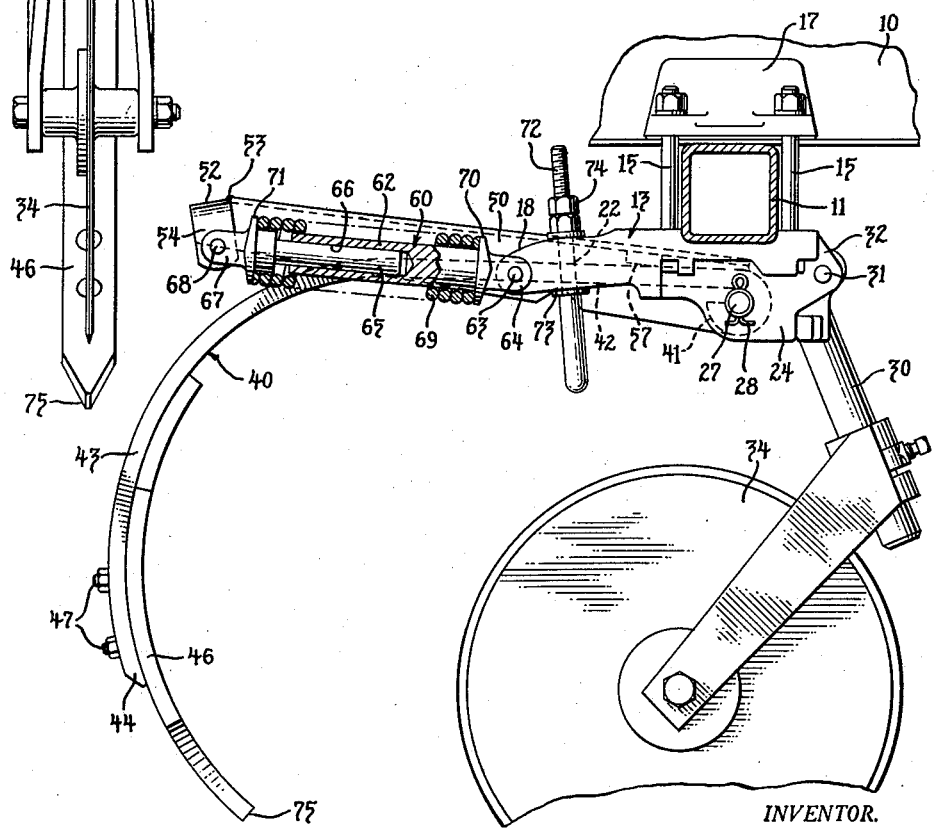
Figure 4 is a side elevational view of the device shown in Figure 1, with certain parts in section, but with the tool raised to the inoperative or "tripped" position, and with no deflection or flexing of the shank.

After the tool has been tripped and raised to the position shown in Figure 4, it will automatically reset itself as point 68 does not quite go over dead-centre relative to points 63 and 27.

It will be noted that the downward pressure is applied to a point adjacent the forward or pivot end of the shank. As a result, the major portion of the length of the shank is unobstructed which permits it to flex freely along a substantial portion of its length. Even when working under normal conditions, that without encountering obstructions, the shank will continually flex to a limited degree. As hereinbefore mentioned, the invention finds particular utility when used with flexible shank and the type shown in the drawings is of the flat spring shank variety.

With the major portion of the length of the shank unobstructed, it is free to flex considerably and thus clear itself from overhanging obstructions. In other words, upon impact, the point 75 of the shank may assume the position shown in dotted lines in Fig. 1 when the entire shank has not been, or is only partially, tripped. The angle of attack of the tool has decreased considerably and a rearward component of movement is thus taken by the point 75 in addition to a simultaneous or slightly subsequent bodily raising of the tool.

Stated otherwise, the ground engaging tool has a preload, due to the two spring units, which exceeds the maximum average load imposed on the tool point. Due to the flexibility of the shank itself, continual flexing to a certain degree causes the attack angle to change. If the draft load imposed on the tool point is to sufficient magnitude, this flexing of the shank will change the attack angle of the tool from 50 to 65 percent and, in conjunction with the vertical clearance afforded by the spring units, obstacle clearance is assured.

In accordance with this invention, the spring pressure is applied in such a manner so as to leave the shank free to flex. Additionally, the force required to raise the tool diminishes as the upward movement of the tool progresses as follows.

In Fig. 1, the tool is in the working position and pivot point 20 is located to the rear and above the pivotal connection 27. The moment arm through which the spring units act relative to the pivot point 27 is designated by the broken line $a$. In the raised position however, as indicated in Fig. 4, the moment arm has been reduced to practically zero as the points 68, 63 and 27 have assumed a nearly dead-centre position. Thus it can be seen that as the tool is raised, the moment arm progressively decreases and while doing so the spring is being compressed and its reactive force therefore increases. The decreasing moment arm and the increasing compressive strength of the spring are so balanced so that a diminishing force is required to continue raising the tool as the latter is raised. This is in contrast to the conventional mountings in which this force must increase, as the tool is raised, in order to continue upward movement of the tool.

With this construction and arrangement of parts, a tool mounting is provided which is highly efficient in operation. Springs of economical size and strength can be utilized which afford a tool release mechanism of relatively high preload valves. At the same time good ground clearance is assured as well as the highly desirable ability of the tool to move immediately in a rearward direction when any type obstacle is encountered.

Having thus shown and described the invention, what is desired to be secured by United States Letters Patent is:

1. In a ground-working implement, the combination comprising, a support structure including a rearwardly extending, generally horizontal mounting bracket, a resiliently flexible spring shank pivoted at its upper end to the lower side of the forward end of said bracket, said shank extending rearwardly and downwardly for supporting an earth working tool in operating position, a rigid pressure transmitting member pivoted to the lower edge of said bracket and extending rearwardly so as to overlie said shank, said member and said shank being in abutting engagement only at a point closely spaced from the pivot of said shank so that the major portion of said shank is free to flex, and a resiliently compressible strut extending from the rear end of said bracket to the rear end of said member so as to urge the member, and thus the shank, down into an operating position.

2. In a ground-working implement the combination comprising, a support structure including a rearwardly extending, generally horizontal mounting bracket, a resiliently flexible spring shank pivoted at its upper end to the lower side of the forward end of said bracket, said shank extending rearwardly and downwardly for supporting an earth working tool in operating position, a rigid pressure transmitting member pivoted at the same point as said shank and extending rearwardly so as to overlie the shank, said member and said shank being in abutting engagement only at a point closely spaced from their common pivot so that the major portion of said shank is free to flex, and a resiliently compressible strut extending from the rear end of said bracket to the rear end of said member so as to urge the member, and thus the shank, down into an operation position.

References Cited in the file of this patent

UNITED STATES PATENTS

| 260,239 | Rix | Jan. 27, 1882 |
| 513,185 | Hewitt | Jan. 23, 1894 |
| 2,690,111 | Altgelt | Sept. 28, 1954 |

FOREIGN PATENTS

| 835,237 | Germany | Mar. 31, 1952 |
| 6,356 | Great Britain | Mar. 21, 1908 |